US008409715B2

(12) United States Patent
Yokota et al.

(10) Patent No.: US 8,409,715 B2

(45) Date of Patent: Apr. 2, 2013

(54) CATION-POLYMERIZABLE RESIN COMPOSITION CONTAINING MULTI-BRANCHED POLYETHER POLYOL, ADHESIVE AGENT COMPRISING THE COMPOSITION, AND LAMINATE AND POLARIZING PLATE USING THE ADHESIVE AGENT

(75) Inventors: Kouichi Yokota, Tokyo (JP); Koujirou Tanaka, Osaka (JP); Toshihiro Ooki, Osaka (JP); Rainer B. Frings, Berlin (DE)

(73) Assignee: DIC Corporation, Tokyo (JP)

( * ) Notice: Subject to any disclaimer, the term of this patent is extended or adjusted under 35 U.S.C. 154(b) by 124 days.

(21) Appl. No.: 12/226,519

(22) PCT Filed: Jul. 31, 2007

(86) PCT No.: PCT/JP2007/064958

§ 371 (c)(1), (2), (4) Date: Oct. 21, 2008

(87) PCT Pub. No.: WO2008/041409

PCT Pub. Date: Apr. 10, 2008

(65) Prior Publication Data

US 2009/0181263 A1 Jul. 16, 2009

(30) Foreign Application Priority Data

Sep. 29, 2006 (JP) ................................ 2006-267284

(51) Int. Cl.
*B32B 27/38* (2006.01)
*C08G 59/50* (2006.01)

(52) U.S. Cl. ........................................ 428/413; 523/400

(58) Field of Classification Search .................. 428/413
See application file for complete search history.

(56) References Cited

U.S. PATENT DOCUMENTS 4,195,167 A * 3/1980 Knopf et al. .................. 528/408
5,674,922 A * 10/1997 Igarashi et al. ............... 522/168
6,166,101 A 12/2000 Takami
6,287,745 B1 * 9/2001 Yamamura et al. ........... 430/269
(Continued)

FOREIGN PATENT DOCUMENTS

EP 0345073 A1 12/1989
EP 0848292 6/1998
(Continued)

OTHER PUBLICATIONS

Meath et al, ACS Symposium Series, Washington, DC, 1977.*

(Continued)

*Primary Examiner* — Callie Shosho
*Assistant Examiner* — Coris Fung
(74) *Attorney, Agent, or Firm* — Edwards Wildman Palmer LLP; James E. Armstrong, IV; Nicholas J. DiCeglie, Jr.

(57) ABSTRACT

The present invention provides a cation-polymerizable resin composition comprising (A) a multi-branched polyether polyol obtained from a ring-opening reaction of (a1) a hydroxyalkyloxetane and (a2) an epoxy compound having one epoxy group, (B) an alicyclic epoxy compound having at least two alicyclic epoxy groups, and (C) an acid generator, which may be used in various uses including, for example, an adhesive agent or tackiness agent for optical elements, various kinds of coating agents and the like.

21 Claims, 3 Drawing Sheets n EOXA + m PO → Lewis acid, solvent → HBPP

U.S. PATENT DOCUMENTS

| | | | | |
|---|---|---|---|---|
| 6,617,418 | B1 * | 9/2003 | Magnusson et al. | 528/417 |
| 7,091,308 | B2 * | 8/2006 | Haggman et al. | 528/417 |
| 2005/0153079 | A1 * | 7/2005 | Hieda et al. | 428/1.2 |
| 2005/0215749 | A1 * | 9/2005 | Miyake et al. | 528/87 |
| 2009/0286940 | A1 * | 11/2009 | Frings et al. | 525/460 |

FOREIGN PATENT DOCUMENTS

| | | | |
|---|---|---|---|
| EP | 1302499 A2 | | 4/2003 |
| JP | 45-272 | | 1/1970 |
| JP | 10-168106 | | 6/1998 |
| JP | 10-330717 | | 12/1998 |
| JP | 11-181391 | | 7/1999 |
| JP | 2003-509553 | | 3/2003 |
| JP | 2003-231860 | | 8/2003 |
| JP | 2005-068292 | * | 3/2005 |
| JP | 2005-515283 | | 5/2005 |
| JP | 2006-282698 | * | 10/2006 |
| WO | WO-01/19895 | | 3/2001 |
| WO | WO-03/062306 | | 7/2003 |
| WO | WO 2006/098676 A1 | | 9/2006 |

OTHER PUBLICATIONS

KEM, http://www.kyoto-kem.com/en/pdf/industry/OrganicIndustrialProduct/ETIR-99386.pdf (Retreived Jan. 2011).*

Suzuki et al., JP 2005-068292 machine translation. Mar. 17, 2005.*

Frings et al., JP 2006-282698 machine translation. Oct. 19, 2006.*

Yiyong Mai et al., "Synthesis and Size-Controllable Self-Assembly of a Novel Amphiphilic Hyperbranched Multiarm Copolyether," Macromolecules, vol. 38, 2005, pp. 8679-8686.

International Search Report mailed Sep. 18, 2007, issued on PCT/JP2007/064958.

European Search Report in connection with Application No. 07791643.5 dated Jan. 21, 2013.

* cited by examiner

CATION-POLYMERIZABLE RESIN COMPOSITION CONTAINING MULTI-BRANCHED POLYETHER POLYOL, ADHESIVE AGENT COMPRISING THE COMPOSITION, AND LAMINATE AND POLARIZING PLATE USING THE ADHESIVE AGENT

TECHNICAL FIELD

The present invention relates to a cation-polymerizable resin composition which may be applicable in various fields including adhesive agents, coating agents and the like, and particularly suitably applicable as an adhesive agent used for manufacturing optical elements such as a polarizing plate.

This application claims priority on Japanese Patent Application No. 2007-267284, filed on Sep. 29, 2006, the content of which is incorporated by reference herein.

BACKGROUND ART

As adhesive or coating agents, those which have various kinds of curing systems are known. Among those, ones that can form a high crosslinking density adhesive layer or coated film by carrying out a curing reaction under heating, UV irradiation, and the like have recently received attention due to their possibility of exhibiting good adhesion strength or good strength of a coated film.

As a resin composition that can be cured by heating or UV irradiation, a radical polymerizable composition and an ionic polymerizable composition are mainly known.

Among those, as a radical polymerizable resin composition, for example, those containing a compound having a polymerizable unsaturated double bond and a radical polymerization initiator have been previously known.

However, there have been cases where the radical polymerization of the resin composition is terminated by a termination reaction between radicals or radical deactivation due to an effect of oxygen in the atmosphere before achieving sufficient curing of the composition. In addition, there have been cases where cure shrinkage of the radical polymerizable resin composition occurs during the polymerization reaction.

On the other hand, as an ionic polymerizable resin composition, cation-polymerizable ones are known in which an active species for polymerization is a cation, and anion polymerizable ones are known in which an active species is an anion.

Because the ionic polymerization does not employ a curing reaction by radicals, the ionic polymerization does not cause a radical termination reaction or radical deactivation as mentioned above and continues even in the case where UV irradiation or heating on the composition is ceased during the polymerization. In addition, the ionic polymerizable resin composition shows a lesser degree of cure shrinkage compared with a radical polymerizable composition.

Accordingly, the ionic polymerizable resin composition has been anticipated as a material applicable for optical elements such as digital video discs (DVDs) and polarizing plates in which a slight deformation of a substrate and the like may be a problem.

Regarding the ionic polymerizable resin composition, many kinds of compositions have been studied so far, and, for example, it has been found that an adhesive composition containing a cation-polymerizable compound, a compound having at least two hydroxyl groups in its molecule and a photo-cation polymerization initiator can be cured within a short period and has excellent properties such as adhesive strength, thus it can be used for manufacturing a liquid display panel and the like (for example, refer to Japanese Unexamined Patent Application, First Publication No. H10-330717). More specifically, the above Japanese Unexamined Patent Application, First Publication No. H10-330717 discloses an adhesive composition containing bis(2,3-epoxycyclohexyl methyladipate) as a cation-polymerizable compound, polytetramethyleneglycol as a compound having at least two hydroxyl groups within its molecule, and 7-[di(4-fluoro)phenylsulfonio]-2-chlorothioxanthone hexafluorophosphate as a photo-cation polymerization initiator.

However, since it is difficult to say that the above-mentioned adhesive composition has a practically sufficient level of adhesive strength for various substrates, and then in industrial fields there has been a demand for an adhesive exhibiting more excellent adhesive strength.

In addition, as the cation-polymerizable resin composition, for example, a curable composition containing at least one oxetane compound, at least one multifunctional alicyclic epoxy compound, at least one multifunctional hydroxy compound and at least one curing agent is known that can be used for various uses including an adhesive agent due to its fast curing rate after UV irradiation (for example, refer to Published Japanese Translation No. 2003-509553).

The Published Japanese Translation No. 2003-509553 discloses that as the multifunctional hydroxyl compound contained in the curable composition, aliphatic dihydroxy compound reactants such as higher polyoxyethylene glycols or higher polyoxytetramethylene glycols, aliphatic trihydroxy compound reactants such as higher polyoxypropylene glycols, or aliphatic multifunctional hydroxy compound reactants such as dendritic polymers which are commercially available as BOLTORN, a registered trademark from Perstorp Co. can be used.

However, there have been cases where a practically required level of adhesive strength cannot be achieved in the above-mentioned curable composition containing the aliphatic dihydroxy compound reactants or aliphatic trihydroxy compound reactants and the like as the multifunctional hydroxyl compound.

Meanwhile, there have been cases where a rather good adhesive strength can be achieved if the curable composition includes a polyester type dendritic polymer exemplified as the aliphatic multifunctional hydroxy compound reactants, as in the Published Japanese Translation No. 2003-509553.

However, it is difficult to say that the curable composition has excellent storage stability as a significant increase in viscosity may occur when stored for about 1 to 2 weeks or more. In addition, it is also difficult to determine whether the curable composition has a practically sufficient level of curability as it shows a fast curing rate, but if the obtained cured product is in contact with an organic solvent and the like, the cured product is partially eluted.

An object of the present invention is to provide a cation-polymerizable resin composition which can form a cured product which is excellent in storage stability, adhesive strength and curability.

DISCLOSURE OF THE INVENTION

The present inventors began the investigation on the basis of a cation-polymerizable resin composition containing a hydroxyl group-containing compound having a scope of selecting a raw material as a cation-polymerizable resin and an acid generator, from the viewpoint of further expanding the uses of a cation-polymerizable resin composition.

Specifically, the present inventors have investigated various combinations of a hydroxyl group-containing compound such as commercially available polyester polyols or polyether polyols and the like with an acid generator as well as investigated combining various kinds of a cation-polymerizable compound such as an alicyclic epoxy compound and the like. However, a cation-polymerizable resin composition which can solve the above-mentioned object was not found by such investigations.

The present inventors have further investigated kinds or amounts of a cation-polymerizable group directly participating in a cation polymerization to determine if they may be important in improving adhesive strength or curability.

Specifically, the present inventors have the investigated aliphatic multifunctional hydroxy compound reactants having plural hydroxyl groups as disclosed in Japanese Patent Application Publication No. 2003-509553 or other various kinds of multifunctional hydroxy compounds as the above-mentioned hydroxyl group-containing compound. However, the above-mentioned object was not achieved either.

Under such circumstances, the present inventors synthesized a novel multi-branched polyether polyol having plural hydroxyl groups obtained from a reaction of a hydroxyalkyloxetane and an epoxy compound having one epoxy group, and then investigated the properties of a cation-polymerizable resin composition comprising the multi-branched polyether polyol, an alicyclic epoxy compound having at least two alicyclic epoxy groups and an acid generator to find that the composition has excellent storage stability, adhesive strength and curability and thus completed the present invention.

That is, the present invention relates to a cation-polymerizable resin composition comprising (A) a multi-branched polyether polyol obtained from a ring-opening reaction of (a1) a hydroxyalkyloxetane and (a2) an epoxy compound having one epoxy group, (B) an alicyclic epoxy compound having at least two alicyclic epoxy groups, and (C) an acid generator.

In addition, the present invention relates to an adhesive agent comprising the above-mentioned cation-polymerizable resin composition.

Further, the present invention relates to a laminate including at least two substrates that are adhered by the above-mentioned adhesive agent, and to a polarizing plate wherein a film comprising a resin having a cyclic olefin structure is adhered to a surface of a polarizer by the above-mentioned adhesive agent.

The cation-polymerizable resin composition according to the present invention has excellent storage stability, adhesive strength and curability, and thus can be used in a wide range of fields including, for example, various kinds of adhesive agents and tackiness agents such as an adhesive for optical elements and the like, various kinds of sealing agents such as a seal agent for liquid crystals and the like, various kinds of resists such as a resist for liquid phase printed circuit board, a dry film resist and the like, various kinds of coating agents such as a coating agent for a releasing paper, a coat agent for a photodisc, a can coating agent, a surface coat agent for an artificial leather/a synthetic leather and the like, vehicles for various kinds of inks such as an ink for a flat panel, a screen ink, a flexo ink, a gravure ink, a jet ink and the like, and has a great value of practical use.

BEST MODE FOR CARRYING OUT THE INVENTION

Figure 1:
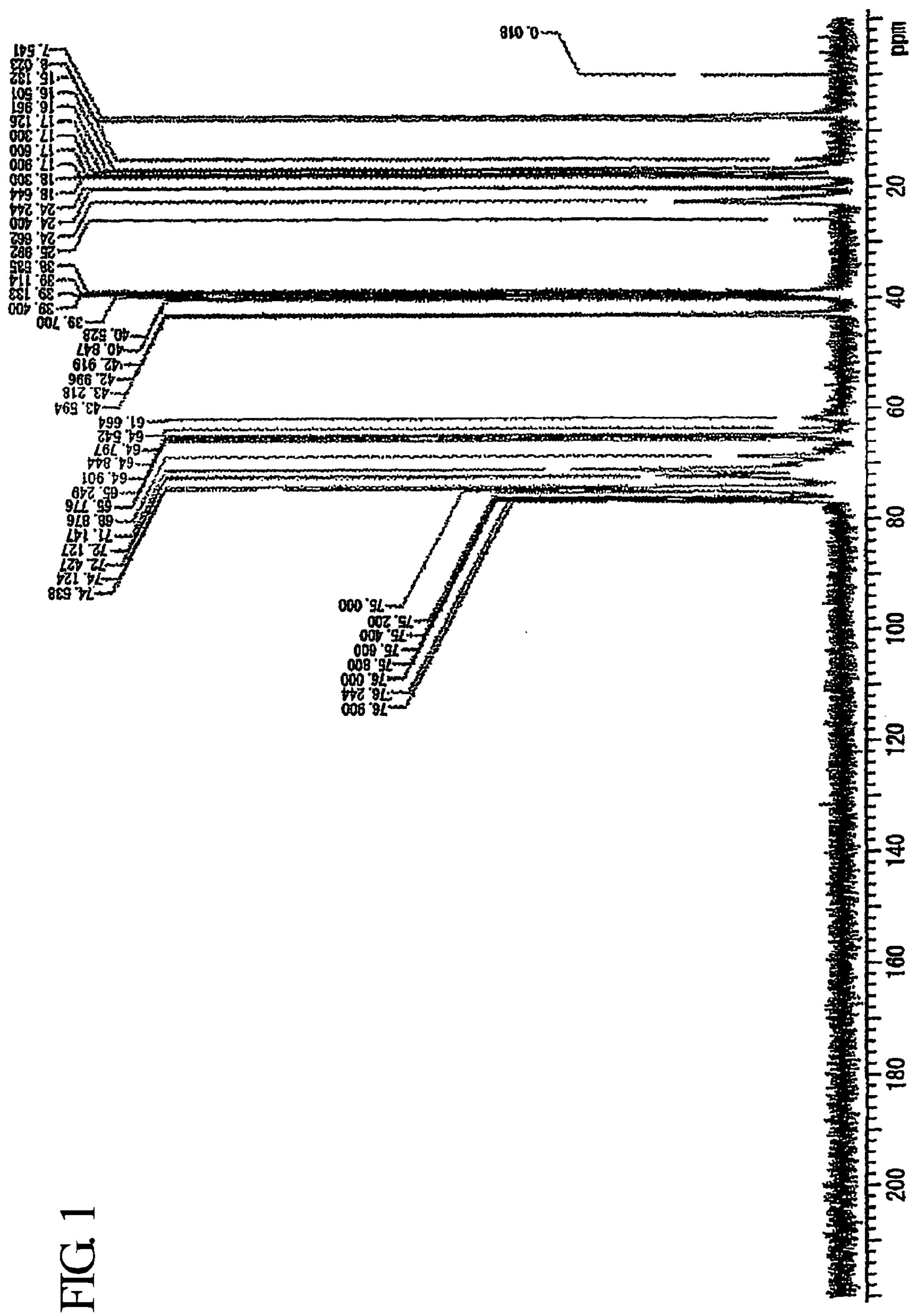
FIG. 1 is a chart graph of $^{13}C$-NMR of a multi-branched polyether polyol (I) obtained from Synthetic Example 1.

The present invention provides a cation-polymerizable resin composition which comprises (A) a multi-branched polyether polyol obtained from a ring-opening reaction of (a1) a hydroxyalkyloxetane and (a2) an epoxy compound having one epoxy group, (B) an alicyclic epoxy compound having at least two alicyclic epoxy groups, (C) an acid generator, and optionally other various kinds of additives as necessary.

First, the multi-branched polyether polyol (A) used in the present invention is described hereinbelow.

The multi-branched polyether polyol (A) used in the present invention is obtained from a ring-opening reaction of (a1) a hydroxyalkyloxetane and (a2) an epoxy compound having one epoxy group. Here, the term, "multi-branched" means a molecular structure wherein the molecular chain is branched into at least two branches and then the branches are branched again into at least two.

The multi-branched polyether polyol (A) preferably has at least four hydroxyl groups within one molecule and more preferably has 4 to 20 hydroxyl groups.

The multi-branched polyether polyol (A) has a number average molecular weight in a range of preferably 1,000 to 4,000, more preferably 1,300 to 3,500.

The multi-branched polyether polyol (A) has a hydroxylic value in a range of preferably 150 to 350, more preferably 170 to 330.

Since the multi-branched polyether polyol having the above-mentioned ranges of the number average molecular weight and the hydroxylic value is in a liquid phase at room temperature, it is easily blended with (B) an alicyclic epoxy compound, (C) an acid generator and the like described herein below. The cation-polymerizable resin composition according to the present invention comprising the multi-branched polyether polyol having the above-mentioned ranges of the number average molecular weight and the hydroxylic value is easily coated and has excellent wetting property to a substrate. Further, the term "a liquid phase" means having fluidity at room temperature, and specifically a state wherein the viscosity measured by a BH type rotating viscometer is 100 Pa·s (25° C.) or lower.

The multi-branched polyether polyol (A) has various structures obtained from a ring-opening polymerization of (a1) the hydroxyalkyloxetane and (a2) the epoxy compound.

Specifically, for example, when a compound represented by the following chemical formula 1 as (a1) the hydroxyalkyloxetane and a compound represented by the following chemical formula 2 as (a2) the epoxy compound are subject to a ring-opening reaction, various structural units represented by the following OR1 to OR3, OE1, OE2, ER1, EE1, EE2 and the like are formed. That is, the multi-branched polyether polyol (A) comprises a structural unit suitably selected from repeating units or end structural units represented by the OR1 to OR3, OE1, OE2, ER1, EE1, EE2 and the like:

[Chemical Formula 1]

(1)

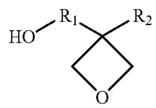

(In the formula 1, $R_1$ represents a methylene group, an ethylene group or a propylene group, $R_2$ represents a hydrogen atom, an alkyl group having 1 to 8 carbon atom(s), an alkoxyalkyl group having 1 to 5 carbon atom(s), or a hydroxyalkyl group having 1 to 6 carbon atom(s)).

[Chemical Formula 2]

(2)

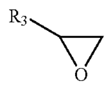

(In the formula 2, $R_3$ represents an organic residual group).

[Chemical Formula 3]

OR1

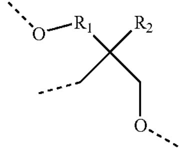

OR2

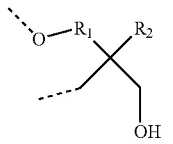

OR3

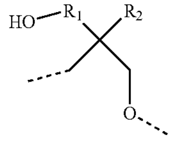

OE1

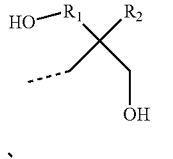

OE2

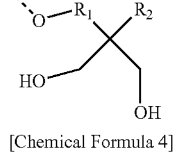

[Chemical Formula 4]

ER1

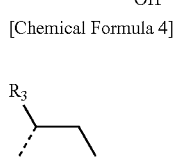

-continued

EE1

EE2

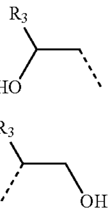

wherein, a solid line in each structural unit of OR1 to OR3, OE1, OE2, ER1, EE1, and EE2 represents a single bond within the structural unit and a dashed line represents a single bond forming an ether bond between the one structural unit and other structural unit.

The above-mentioned OR1 to OR3, OE1, and OE2 are structural units derived from the hydroxyalkyloxetane (a1), and among those, OR1 to OR3 represent a repeating unit and OE1 and OE2 represent an end structural unit of the multi-branched polyether polyol (A).

ER1, EE1, and EE2 are structural units derived from the epoxy compound (a2), and among those, ER1 represents a repeating unit, and EE1 and EE2 represent an end structural unit of the multi-branched polyether polyol (A).

That is, the multi-branched polyether polyol (A) has a continuous multi-branched structure by a repeating unit selected from OR1 to OR3 and ER1. The multi-branched polyether polyol (A) may have an end structural unit selected from OE1, OE2, EE1 and EE2 at the end of the multi-branched structure. Further, these repeating units and end structural units may be present as any constitution if there is no particular problem and may be present in any ratio or amount. For example, the repeating unit and end structural units may be randomly present or OR1 to OR3 may form a central part of the molecular structure having the above-mentioned end structural units at the end of the molecular structure.

The multi-branched polyether polyol (A) preferably has a primary hydroxyl group and a secondary hydroxyl group within the molecular structure. Particularly, due to a reaction-retarding property of a secondary hydroxyl group, it is assumed that a rather long period of usable time of the cation-polymerizable resin composition according to the present invention can be ensured.

Further, the molecular structure of the multi-branched polyether polyol (A) has a three-dimensional structure such as a spherical form or tree branch form and the like due to the multi-branching. In this case, it is assumed that the hydroxyl groups are directed to the outside of the above-mentioned forms. Accordingly, even if the reaction rate is decreased by the presence of a secondary hydroxyl group, most of the hydroxyl groups present in the multi-branched polyether polyol (A) can sufficiently participate in the reaction ultimately and thus it is thought that the crosslinking density of a cured product comprising the cation-polymerizable resin composition according to the present invention can be significantly improved.

As such, from the viewpoint of an improvement of a sufficiently long period of usable time of the cation-polymerizable resin composition according to the present invention and an excellent curability of the obtained cured product, the number of secondary hydroxyl groups in the multi-branched polyether polyol (A) is preferably 20 to 70% with respect to the total number of the hydroxyl groups, more preferably 25 to 60%.

Furthermore, as the hydroxyalkyloxetane (a1) which can be used for synthesizing the multi-branched polyether polyol (A), for example, a compound comprising a structure represented by the following structural formula 1 can be used individually or a combination of two or more thereof:

[Chemical Formula 5]

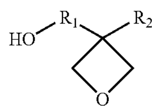

(1)

(In the formula 1, $R_1$ represents a methylene group, an ethylene group or a propylene group, $R_2$ represents a hydrogen atom, an alkyl group having 1 to 8 carbon atom(s), an alkoxyalkyl group having 1 to 5 carbon atom(s), or a hydroxyalkyl group having 1 to 6 carbon atom(s)).

Examples for the alkyl group having 1 to 8 carbon atom(s) constituting $R_2$ in the above structural formula 1 may include a methyl group, ethyl group, n-propyl group, i-propyl group, 2-ethylhexyl group, and the like.

Examples for the alkoxyalkyl group having 1 to 5 carbon atom(s) constituting $R_2$ in the above structural formula 1 may include a methoxymethyl group, ethoxymethyl group, propoxymethyl group, methoxyethyl group, ethoxyethyl group, propoxyethyl group, and the like.

Examples for the hydroxyalkyl group having 1 to 6 carbon atom(s) constituting $R_2$ in the above structural formula 1 may include a hydroxymethyl group, hydroxyethyl group, hydroxypropyl group, and the like.

As the hydroxyalkyloxetane (a1), it is preferable to use compounds wherein $R_1$ is a methylene group and $R_2$ is an alkyl group having 1 to 7 carbon atom(s) in the structural formula 1, and among those, more preferably 3-hydroxymethyl-3-ethyloxetane, and 3-hydroxy-methyl-3-methyloxetane, and even more preferably 3-hydroxymethyl-3-ethyloxetane, from the viewpoint of being effective in lowering viscosity and making a liquid phase of the obtained multi-branched polyether polyol (A).

As the epoxy compound (a2) having one epoxy group subject to a ring-opening polymerization reaction with the hydroxyalkyloxetane (a1), for example, a compound comprising a structure represented by the following structural formula 2 can be used individually or a combination of two or more thereof:

[Chemical Formula 6]

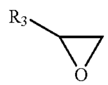

(2)

(In the formula 2, $R_3$ represents an organic residual group).

The organic residual group constituting $R_3$ in the above structural formula 2 may be a hydrogen atom, an alkyl group having 1 to 8 carbon atom(s), an alkoxyalkyl group having 1 to 5 carbon atom(s), or a hydroxyalkyl group having 1 to 6 carbon atom(s), the same as exemplified for $R_2$ in the above structural formula 1. The organic residual group may be a divalent organic residual group, which may form a ring by bonding to two carbons forming the epoxy group.

More specifically, as the epoxy compound (a2), alkylene oxides, alicyclic structure-containing oxides, glycidyl ethers, glycidyl esters and the like can be used.

As the alkylene oxides, for example, propylene oxide, 1-butene oxide, 1-pentene oxide, 1-hexene oxide, 1,2-epoxyoctane, 1,2-epoxydodecane, fluoroalkyl epoxide and the like can be used.

As the alicyclic structure-containing oxides, for example, cyclohexene oxide, cyclooctene oxide, cyclododecane oxide and the like can be used.

As the glycidyl ethers, for example, methylglycidylether, ethylglycidylether, n-propylglycidylether, i-propylglycidylether, n-butylglycidylether, i-butylglycidylether, n-pentylglycidylether, 2-ethylhexylglycidylether, undecylglycidylether, hexadecylglycidylether, arylglycidylether, phenylglycidylether, 2-methylphenylglycidylether, 4-t-butylphenylglycidylether, 4-nonylphenylglycidylether, 4-methoxyphenylglycidylether, fluoroalkylglycidylether and the like can be used.

As the glycidyl esters, for example, glycidyl acetate, glycidyl propionate, glycidyl butyrate, glycidyl methacrylate, glycidyl benzoate and the like can be used.

As the epoxy compound (a2), it is preferable to use the alkylene oxides, and among those, more preferred to use propylene oxide, 1-buteneoxide, 1-pentene oxide, or 1-hexene oxide, even more preferable to use propylene oxide, from the viewpoint of being effective in lowering viscosity and making a liquid phase of the multi-branched polyether polyol (A).

The multi-branched polyether polyol (A) can be synthesized, for example, by a ring-opening polymerization reaction of the hydroxyalkyloxetane (a1) and the epoxy compound (a2). As this synthetic process, for example, the following (Method 1) to (Method 4) may be mentioned.

(Method 1)

The hydroxyalkyloxetane (a1) and the epoxy compound (a2) are mixed in a molar ratio of [the hydroxyalkyloxetane (a1)]/[the epoxy compound (a2)]=preferably 1/1 to 1/10, more preferably 1/1 to 1/6, even more preferably 1/1 to 1/3. The obtained mixture and an organic solvent are mixed and dissolved in a mass ratio of [{sum of the hydroxyalkyloxetane (a1) and the epoxy compound (a2)}/the organic solvent] preferably 1/1 to 1/5, more preferably 1/1.5 to 1/4, even more preferably 1/1.5 to 1/2.5, which is used as a raw material solution.

As the organic solvent, for example, diethyl ether, di-i-propyl ether, di-n-butyl ether, di-i-butyl ether, di-t-butyl ether, t-amyl methyl ether, t-butyl methyl ether, cyclo pentyl methyl ether, dioxolane and the like can be used. It is preferable that these do not substantially contain peroxides, which can inhibit the reaction of the hydroxyalkyloxetane (a1) and the epoxy compound (a2).

Then, a polymerization initiator or a solution thereof in an organic solvent is added dropwise into the above-mentioned raw material solution cooled to −10° C. to −15° C. for 0.1 to 1 hour, preferably for 0.3 to 0.8 hour, more preferably for 0.3 to 0.5 hour, with stirring.

After the completion of the dropwise addition, the raw material solution containing the polymerization initiator is stirred until the temperature thereof reaches 25° C. Then, the solution is heated to a temperature at which reflux can occur to carry out the ring-opening polymerization reaction for 0.5 to 20 hours until most of the hydroxyalkyloxetane (a1) and the epoxy compound (a2) are converted into the multi-branched polyether polyol (A).

The conversion rate of the hydroxyalkyloxetane (a1) and the epoxy compound (a2) into the multi-branched polyether polyol (A) can be confirmed by using gas chromatography, a nuclear magnetic resonance instrument, and an infrared absorption spectrophotometer.

After the completion of the ring-opening polymerization reaction, the polymerization initiator remaining in the obtained reaction solution is deactivated by using an equivalent amount of an alkali hydroxide solution or sodium alkoxide, potassium alkoxide. Next, the reaction solution is filtrated, and the multi-branched polyether polyol is extracted using a solvent and then the organic solvent is evaporated off under a reduced pressure to obtain the multi-branched polyether polyol.

As the polymerization initiator which can be used in the above Method 1, for example, Bronsted acids such as sulfuric acid, hydrochloric acid, $HBF_4$, $HPF_6$, $HSbF_6$, $HAsF_6$, p-toluene sulfonic acid, trifluoromethane sulfonic acid and the like, Lewis acids such as $BF_3$, $AlCl_3$, $TiCl_4$, $SnCl_4$ and the like, onium salt compounds such as triarylsulfonium-hexafluorophosphate, triarylsulfonium-antimonate, diaryliodonium-hexafluorophosphate, diaryliodonium-antimonate, N-benzylpyridinium-hexafluorophosphate, N-benzylpyridinium-antimonate and the like, triphenylcarbonium salts such as triphenylcarbonium-tetrafluoroborate, triphenylcarbonium-hexafluorophosphate, triphenylcarbonium-hexafluoroantimonate and the like, p-toluenesulfonylchloride, methanesulfonylchloride, trifluoromethanesulfonylchloride, p-toluene sulfonic acid anhydride, methane sulfonic acid anhydride, trifluoromethane sulfonic acid anhydride, p-toluene sulfonic acid methyl ester, p-toluene sulfonic acid ethyl ester, methane sulfonic acid methyl ester, trifluoromethane sulfonic acid methyl ester, trifluoromethane sulfonic acid trimethyl silyl ester and the like can be mentioned.

As the polymerization initiator, it is preferable to use $HPF_6$, $HSbF_6$, $HAsF_6$, triphenylcarbonium-hexafluorophosphate and $BF_3$, and it is more preferable to use $HPF_6$, triphenylcarbonium-hexafluorophosphate and $BF_3$ among those, from the viewpoint of improving reactivity.

The polymerization initiator can be used by dissolving in an organic solvent. As the organic solvent, for example, diethyl ether, di-i-propyl ether, di-n-butyl ether, di-i-butyl ether, di-t-butyl ether, t-amyl methyl ether, t-butyl methyl ether, cyclopentyl methyl ether or dioxolane can be used.

The concentration of the polymerization initiator contained in the above-mentioned organic solvent solution is preferably 1 to 90 mass %, more preferably 10 to 75 mass %, even more preferably 25 to 65 mass %, from the viewpoint of improving reactivity of the hydroxyalkyloxetane (a1) with the epoxy compound (a2).

The polymerization initiator can be used in a ratio of preferably 0.01 to 1.0 mole %, more preferably 0.03 to 0.7 mole %, even more preferably 0.05 to 0.5 mole % with respect to the total molar amount of the hydroxyalkyloxetane (a1) and the epoxy compound (a2).

(Method 2)

The hydroxyalkyloxetane (a1) and the epoxy compound (a2) are mixed in a molar ratio of [the hydroxyalkyloxetane (a1)]/[the epoxy compound (a2)]=1/1 to 1/10, preferably 1/1 to 1/6, more preferably 1/1 to 1/3.

Meanwhile, a solution of the polymerization initiator is prepared separately from the above. The polymerization initiator solution is prepared by mixing and stirring the polymerization initiator and an organic solvent. The kind and amount of the polymerization initiator can be the same as exemplified in the above Method 1. Also, the organic solvent can be the same as exemplified in the above Method 1. The concentration of the organic solvent contained in the solution of the polymerization initiator is in a range wherein a mass ratio of [{sum of the hydroxyalkyloxetane (a1) and the epoxy compound (a2)}/the organic solvent] is 1/0.25 to 1/5, preferably 1/0.3 to 1/3.5, and more preferably 1/0.5 to 1/2.

Next, the above mixture is added dropwise into the solution of the polymerization initiator which is adjusted to 10° C. to 60° C. for 0.1 to 20 hours, and preferably 2 to 10 hours, with stirring. After the completion of the dropwise addition, the solution is maintained at the temperature of 20° C. to 60° C. with stirring to carry out the ring-opening polymerization reaction until most of the hydroxyalkyloxetane (a1) and the epoxy compound (a2) are converted into the multi-branched polyether polyol (A).

After the completion of the reaction, the deactivation of the polymerization initiator and filtration are performed in the same manner as described in the above Method 1, and the multi-branched polyether polyol (A) can be obtained by evaporating off the organic solvent contained in the reaction product.

(Method 3)

The hydroxyalkyloxetane (a1) and the epoxy compound (a2) are mixed in a molar ratio of [the hydroxyalkyloxetane (a1)]/[the epoxy compound (a2)]=preferably 1/1 to 1/10, more preferably 1/1 to 1/6, and even more preferably 1/1 to 1/3. The obtained mixture and a hydrocarbon organic solvent having a boiling point of 70° C. or higher, for example, n-heptane, i-octane, or cyclohexane, are mixed and dissolved in a mass ratio of [{sum of the hydroxyalkyloxetane (a1) and the epoxy compound (a2)}/the hydrocarbon organic solvent having a boiling point of 70° C. or higher] of preferably 1/1 to 1/10, more preferably 1/2 to 1/7, and even more preferably 1/2.5 to 1/3.5, which is used as a raw material solution.

Next, the polymerization initiator is added into the raw material solution which is maintained at preferably 0 to 25° C., more preferably 5 to 15° C., and even more preferably 10 to 15' under stirring. The kind and used amount of the polymerization initiator can be the same as exemplified in the above Method 1.

Immediately after mixing the raw material solution and the polymerization initiator, there is a case where the temperature in the system is increased to about 25 to 40° C. because the inside of the system becomes heterogeneous. In this case, it is preferable to cool the inside of the system down to about 15 to 25° C.

Then, the inside of the system is heated to 40 to 70° C., and preferably 50 to 60° C. to carry out the polymerization reaction for a period of 1 to 5 hours, and preferably 2 to 3 hours until most of the hydroxyalkyloxetane (a1) and the epoxy compound (a2) are converted into the multi-branched polyether polyol (A).

After the completion of the reaction, deactivation of the polymerization initiator and filtration are performed in the same manner as described in the above Method 1, and the multi-branched polyether polyol (A) can be obtained by evaporating off the organic solvent contained in the reaction product.

(Method 4)

The hydroxyalkyloxetane (a1) and the epoxy compound (a2) are mixed in a molar ratio of [the hydroxyalkyloxetane (a1)]/[the epoxy compound (a2)]=preferably 1/1 to 1/10, more preferably 1/1 to 1/6, even more preferably 1/1 to 1/3.

Meanwhile, a solution of the polymerization initiator is prepared separately from the above. The polymerization initiator solution is prepared by mixing and stirring polymerization initiator and an organic solvent. The kind and amount of the polymerization initiator can be the same as exemplified in the above Method 1. Also, the organic solvent can be the same as exemplified in the above Method 1. The amount of the organic solvent contained in the solution of the polymerization initiator is in a range wherein a mass ratio of [{sum of the hydroxyalkyloxetane (a1) and the epoxy compound (a2)}/the organic solvent] is 1/0.25 to 1/5, preferably 1/0.3 to 1/3.5, and more preferably 1/0.5 to 1/2.

Next, the above mixture is added dropwise into the solution of the polymerization initiator which is adjusted to preferably 0 to 25° C. for 0.1 to 20 hours, and preferably 2 to 10 hours with stirring. After the completion of the dropwise addition, the inside of the system is heated to 40 to 70° C., and preferably 50 to 60° C. to carry out the polymerization reaction for a period of 1 to 5 hours, and preferably 2 to 3 hours until most of the hydroxyalkyloxetane (a1) and the epoxy compound (a2) are converted into the multi-branched polyether polyol (A).

After the completion of the reaction, neutralization and filtration of the solution are performed in the same manner as described in the above Method 1, and the multi-branched polyether polyol (A) can be obtained by evaporating off the organic solvent contained in the reaction product.

The content of the multi-branched polyether polyol (A) contained in the cation-polymerizable resin composition according to the present invention is not particularly limited, but a molar ratio of the alicyclic epoxy groups of the alicyclic the epoxy compound (B) to the hydroxyl groups of the multi-branched polyether polyol (A), [the alicyclic epoxy groups of the alicyclic the epoxy compound (B)/the hydroxyl groups of the multi-branched polyether polyol (A)], is in a range of preferably 1 or higher, and more preferably 1 to 5. For the cation-polymerizable resin composition comprising the multi-branched polyether polyol (A) in this range, excellent curability and adhesive strength can be concurrently achieved.

Next, the alicyclic epoxy compound (B) having at least two alicyclic epoxy groups used in the present invention is described.

The above alicyclic epoxy groups of alicyclic epoxy compound (B) mean an epoxy group which is formed by the bonding of one common oxygen atom to two carbon atoms (which are generally adjacent to each other) among the carbon atoms forming the alicyclic structure.

As the above alicyclic epoxy compound (B), it is not particularly limited, but it is preferable to use a compound having 2 to 4 alicyclic epoxy groups, and more preferable to use 3,4-epoxy cyclohexyl methyl-3,4-epoxycyclohexanecarboxylate represented by the following structural formula 3, from the viewpoint of obtaining a cation-polymerizable resin composition wherein both excellent curability and good adhesive strength can be achieved.

As the above alicyclic epoxy compound (B), for example, 3,4-epoxy cyclohexyl methyl-3,4-epoxycyclohexanecarboxylate represented by the following structural formula 3 (a compound wherein a is 0 in the structural formula 3), a caprolactone-modified product thereof (a compound wherein a is 1 in the structural formula 3), a trimethylcaprolactone-modified product thereof (the structural formula 4 and the structural formula 5), a valerolactone-modified product thereof (the structural formula 6 and the structural formula 7), or a compound represented by the structural formula 8 can be used.

[Chemical Formula 7]

(3)

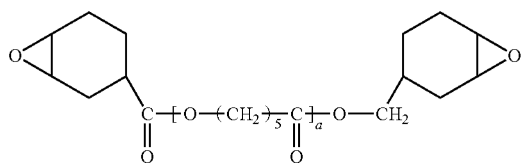

In the above structural formula 3, a represents 0 or 1.

[Chemical Formula 8]

(4)

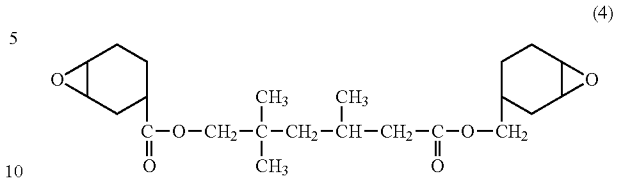

[Chemical Formula 9]

(5)

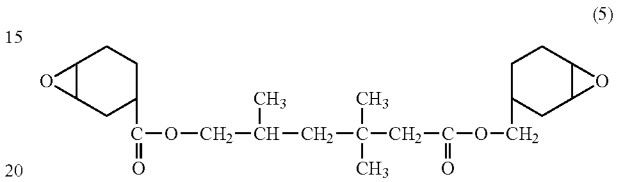

[Chemical Formula 10]

(6)

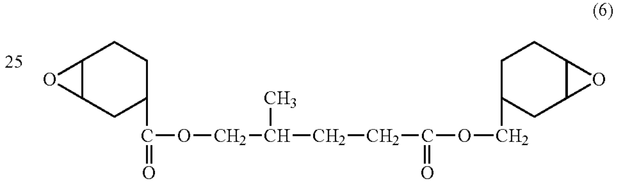

[Chemical Formula 11]

(7)

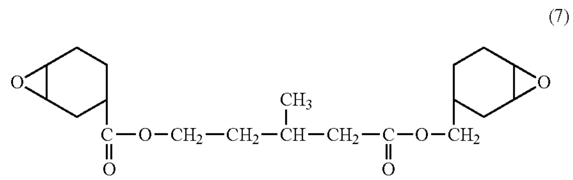

[Chemical Formula 12]

(8)

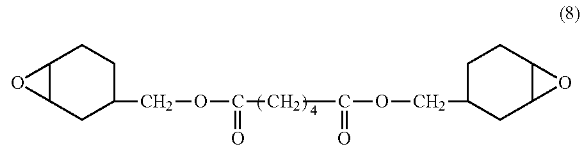

As 3,4-epoxycyclohexyl methyl-3,4-epoxycyclohexane carboxylate and the caprolactone-modified product thereof represented by the above structural formula 3, for example, SEROKISIDE 2021, SEROKISIDE 2021 A, SEROKISIDE 2021 P, SEROKISIDE 2081, SEROKISIDE 2083, and SEROKISIDE 2085 (which are manufactured by Daicel Chemical Industries, Ltd.), CYRACURE UVR-6105, CYRACURE UVR-6107, and CYRACURE UVR-6110 (which are manufactured by Dow Chemical Japan Limited), and the like are commercially available.

As the alicyclic epoxy compound of adipic acid ester type represented by the above structural formula 8, for example, CYRACURE UVR-6128 (manufactured by Dow Chemical Japan Limited) and the like is commercially available.

As the alicyclic epoxy compound having three alicyclic epoxy groups, a compound represented by the following structural formula 9 can be used:

[Chemical Formula 13]

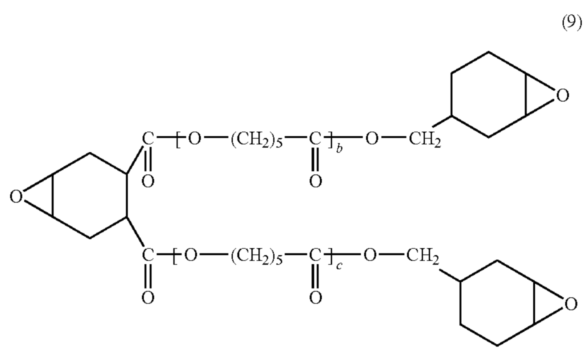

In the structural formula 9, b and c represent independently 0 or 1, which may be the same or different.

As the alicyclic epoxy compound represented by the structural formula 9, for example, Epolead GT301, Epolead GT302 (which are manufactured by Daicel Chemical Industries, Ltd.) and the like are commercially available.

As the alicyclic epoxy compound having four alicyclic epoxy groups, for example, a compound represented by the following structural formula 10 can be used:

[Chemical Formula 14]

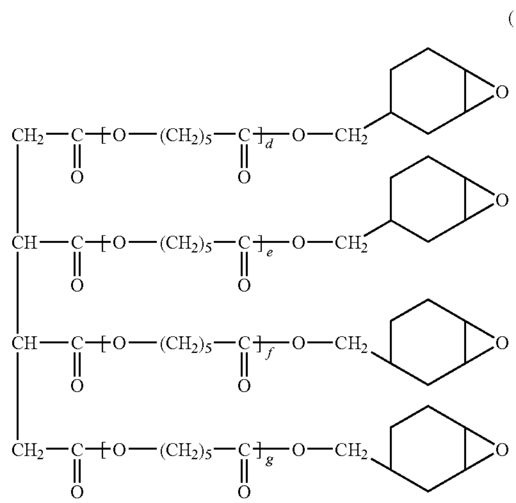

In the structural formula 10, d to g represent independently 0 or 1, which may be the same or different.

As the alicyclic epoxy compound represented by the structural formula 10, for example, Epolead GT401, Epolead GT403 (which are manufactured by Daicel Chemical Industries, Ltd.) and the like are commercially available.

The content of the alicyclic epoxy compound (B) comprised in the cation-polymerizable resin composition according to the present invention is not particularly limited, but a molar ratio of the alicyclic epoxy groups of the alicyclic epoxy compound (B) to the hydroxyl groups of the multi-branched polyether polyol (A), [the alicyclic epoxy groups of the alicyclic the epoxy compound (B)/the hydroxyl groups of the multi-branched polyether polyol (A)], is in a range of preferably 1 or higher and more preferably 1 to 5. When the cation-polymerizable resin composition comprises the alicyclic epoxy compound (B) in this range, excellent curability and adhesive strength can be concurrently achieved.

Next, the acid generator (C) used in the present invention is described.

As the acid generator (C) used in the present invention, for example, a photo acid generator, a thermal acid generator and the like can be used individually or in a combination of two or more thereof.

A photo acid generator means a compound generating an acid which can initiate a cation polymerization by UV irradiation, and a thermal acid generator means a compound generating an acid which can initiate a cation polymerization by heat.

As the above photo acid generator, for example, aromatic sulfonium salt, aromatic iodonium salt, aromatic diazonium salt, aromatic ammonium salt, thioxanthonium salt, (2, 4-cyclopentadiene-1-yl)[(1-methyl ethyl)benzene]-iron salt and the like, which comprise a cation part being aromatic sulfonium, aromatic iodonium, aromatic diazonium, aromatic ammonium, thioxanthonium, (2,4-cyclopentadiene-1-yl)[(1-methylethyl)benzene]-iron cation or thianthrenium, and an anion part being $BF_4^-$, $PF_6^-$, $SbF_6^-$, or $[BX_4]^-$ (provided that X represents a functional group wherein at least two hydrogen atoms of the phenyl ring are substituted by a fluorine atom or trifluoromethyl group), can be used individually or in a combination of two or more thereof.

As the above aromatic sulfonium salt, for example, bis[4-(diphenylsulfonio) phenyl]sulfide bishexafluorophosphate, bis[4-(diphenylsulfonio) phenyl]sulfide bishexafluoroantimonate, bis[4-(diphenylsulfonio) phenyl]sulfide bistetra fluoroborate, bis[4-(diphenylsulfonio)phenyl]sulfide tetrakis (pentafluorophenyl)borate, diphenyl-4-(phenylthio)phenylsulfonium hexafluorophosphate, diphenyl-4-(phenylthio) phenylsulfonium hexafluoroantimonate, diphenyl-4-(phenylthio)phenylsulfonium tetrafluoroborate, diphenyl-4-(phenylthio)phenylsulfonium tetrakis(pentafluorophenyl) borate, triphenylsulfonium hexafluorophosphate, triphenylsulfonium hexafluoroantimonate, triphenylsulfonium tetrafluoroborate, triphenylsulfonium tetrakis(pentafluoro phenyl)borate, bis[4-(di(4-(2-hydroxyethoxy))phenylsulfonio) phenyl]sulfide bis hexa fluoro phosphate, bis[4-(di(4-(2-hydroxyethoxy))phenylsulfonio) phenyl]sulfide bishexafluoroantimonate, bis[4-(di(4-(2-hydroxyethoxy)) phenylsulfonio) phenyl]sulfide bistetrafluoroborate, bis[4-(di (4-(2-hydroxyethoxy))phenylsulfonio) phenyl]sulfide tetrakis(pentafluorophenyl)borate and the like can be used.

As the above aromatic iodonium salt, for example, diphenyliodonium hexafluorophosphate, diphenyliodonium hexafluoroantimonate, diphenyliodonium tetrafluoroborate, diphenyliodonium tetrakis(pentafluorophenyl)borate, bis (dodecyl phenyl)iodonium hexafluorophosphate, bis(dodecyl phenyl)iodonium hexafluoroantimonate, bis(dodecylphenyl)iodonium tetrafluoroborate, bis(dodecylphenyl) iodonium tetrakis(pentafluorophenyl)borate, 4-methylphenyl-4-(1-methylethyl)phenyliodonium hexafluorophosphate, 4-methylphenyl-4-(1-methylethyl) phenyliodonium hexafluoroantimonate, 4-methylphenyl-4-(1-methylethyl)phenyliodonium tetrafluoroborate, 4-methylphenyl-4-(1-methylethyl)phenyliodonium tetrakis (pentafluorophenyl)borate and the like can be used.

As the above aromatic diazonium salt, for example, phenyldiazonium hexafluorophosphate, phenyldiazonium hexafluoroantimonate, phenyldiazonium tetrafluoroborate, phenyldiazonium tetrakis(pentafluorophenyl)borate and the like can be used.

As the above aromatic ammonium salt, for example, 1-benzyl-2-cyanopyridium hexafluorophosphate, 1-benzyl-2-cyanopyridium hexafluoroantimonate, 1-benzyl-2-cyanopyridium tetrafluoroborate, 1-benzyl-2-cyanopyridium tetrakis (pentafluoro phenyl)borate, 1-(naphthylmethyl)-2-cyanopyridium hexafluorophosphate, 1-(naphthylmethyl)-2-cyanopyridium hexafluoroantimonate, 1-(naphthylmethyl)-2-cyanopyridium tetrafluoroborate, 1-(naphthylmethyl)-2-cyanopyridium tetrakis(pentafluoro phenyl)borate and the like can be used.

As the above thioxanthonium salt, for example, S-biphenyl 2-isopropylthioxanthonium hexafluorophosphate and the like can be used.

As the above (2,4-cyclopentadiene-1-yl)[(1-methylethyl) benzene]-iron salt, (2,4-cyclopentadiene-1-yl)[(1-methyl ethyl)benzene]-iron(II) hexa fluoro phosphate, (2,4-cyclopentadiene-1-yl)[(1-methyl ethyl)benzene]-iron(II) hexafluoroantimonate, 2,4-cyclopentadiene-1-yl) [(1-methyl ethyl)benzene]-iron(II) tetra fluoro borate, 2,4-cyclopentadiene-1-yl) [(1-methyl ethyl)benzene]-iron(II) tetrakis(pentafluoro phenyl)borate and the like can be used.

As the above photo acid generator, for example, CPI-100 P, CPI-101 A (which are manufactured by Sanapro Limited); CYRACURE photocure initiator UVI-6990, CYRACURE photocure initiator UVI-6992 and CYRACURE photocure initiator UVI-6976 (which are manufactured by Dow Chemical Japan Limited); Adekaoptomer SP-150, Adekaoptomer SP-152, Adekaoptomer SP-170 and Adekaoptomer SP-172 (which are manufactured by Asahi Denka Kogyo Co., Ltd.); CI-5102 and CI-2855 (which are manufactured by Nihon Soda Co., Ltd.); Sanaid SI-60 L, San-Aid SI-80 L, Sanaid SI-100 L, Sanaid SI-110 L, Sanaid SI-180 L, Sanaid SI-110, Sanaid SI-145, Sanaid SI-150, Sanaid SI-160, and Sanaid SI-180 (which are manufactured by Sanshin Chemical Industry Co., Ltd.); Esacure 1064, Esacure 1187 (which are manufactured by Lamberti Co., Ltd.); Omnicat 432, Omnicat 440, Omnicat 445, Omnicat 550, Omnicat 650, Omnicat BL-550 (which are manufactured by IGM Resins B.V.); Irgacure 250 (manufactured by CIBA Specialty Chemicals Ltd.); RHODORSIL PHOTOINITIATOR 2074 (manufactured by Rhodia Japan Ltd.) and the like are commercially available.

As the above thermal acid generator, for example, a quaternary ammonium salt, sulfonium salt, a phosphonium salt, an iodonium salt and the like, which comprise a cation part being a quaternary ammonium ammonium, a sulfonium, a phosphonium, or an iodonium and a anion part being $BF_4^-$, $PF_6^-$, $SbF_6^-$, $SbF_4^-$, or $AsF_6^-$ can be used individually or in a combination of two or more thereof.

As the above quaternary ammonium salt, for example, N,N-dimethyl-N-benzylanilinium hexafluoroantimonate, N,N-diethyl-N-benzylanilinium tetrafluoroborate, N,N-dimethyl-N-benzylpyridinium hexafluoroantimonate, N,N-diethyl-N-benzylpyridinium trifluoromethanesulfonic acid, N,N-dimethyl-N-(4-methoxybenzyl)pyridinium hexafluoroantimonate, N,N-diethyl-N-(4-methoxybenzyl)pyridinium hexafluoroantimonate, N,N-diethyl-N-(4-methoxybenzyl) toluinium hexafluoroantimonate, N,N-dimethyl-N-(4-methoxybenzyl)toluinium hexafluoroantimonate and the like can be used.

As the above sulfonium salt, for example, triphenylsulfonium tetrafluoroborate, 2-butenyltetramethylenesulfonium hexafluoroantimonate, 3-methyl-2-butenyltetramethylene sulfonium hexafluoroantimonate, triphenylsulfonium hexafluoroantimonate, triphenylsulfonium hexafluoroarsenate, tri(4-methoxyphenyl)sulfonium hexafluoroarsenate, diphenyl(4-phenylthiophenyl)sulfonium hexafluoroarsenate and the like can be used.

As the above phosphonium salt, for example, ethyltriphenylphosphonium tetrafluoroborate, tetrabutylphosphonium tetrafluoroborate and the like can be used.

As the above iodonium salt, for example, diphenyliodonium hexafluoroarsenate, di-4-chlorophenyliodonium hexafluoroarsenate, di-4-bromophenyliodonium hexafluoroarsenate, di-p-tolyliodonium hexafluoroarsenate, phenyl(4-methoxy phenyl)iodonium hexafluoroarsenate and the like can be used.

As the above thermal acid generator, for example, Adekaopton CP-66, Adekaopton CP-77 (which are manufactured by Asahi Denka Kogyo Co., Ltd.); CI-2855 (manufactured by Nihon Soda Co., Ltd.); Sanaid SI-60 L, Sanaid SI-80 L, Sanaid SI-100 L, Sanaid SI-110 L, Sanaid SI-180 L, Sanaid SI-110, Sanaid SI-145, Sanaid SI-150, Sanaid SI-160, Sanaid SI-180 (which are manufactured by Sanshin Chemical Industry Co., Ltd.) and the like are commercially available.

The above CI-2855 (manufactured by Nihon Soda Co., Ltd.); Sanaid SI-60 L, Sanaid SI-80 L, Sanaid SI-100 L, Sanaid SI-110 L, San-Aid SI-180 L, Sanaid SI-110, Sanaid SI-145, Sanaid SI-150, Sanaid SI-160, Sanaid SI-180 (which are manufactured by Sanshin Chemical Industry Co., Ltd.) can generate an acid by either photo-irradiation or heating.

The amount of the above acid generator (C) used is not particularly limited, but it is in a range of preferably 0.1 to 15 mass %, more preferably 0.5 to 10 mass %, and even more preferably 1.0 to 7.5 mass % with respect to the total amount of the multi-branched polyether polyol (A) and the alicyclic epoxy compound (B). By using the acid generator (C) in the above range, the cation-polymerizable resin composition having excellent storage stability, excellent curability and good adhesion to a substrate can be obtained, and the remaining amount of an acid generated from the acid generator (C) in the cured product can be reduced and thus deterioration of a metal substrate due to an acid can be inhibited.

In the cation-polymerizable resin composition according to the present invention, a cation-polymerizable oxetane compound (D) may be further combined with the multi-branched polyether polyol (A), the alicyclic epoxy compound (B) and the acid generator (C). By the combination of the oxetane compound (D), the cation-polymerizable resin composition which can form a cured product having good curability can be obtained.

The above oxetane compound (D) means a compound having an oxetane ring structure within the molecule represented by the following structural formula 11:

[Chemical Formula 15]

(11)

As the oxetane compound (D), for example, a compound represented by the following structural formula 12, 13 and 14 can be used individually or in a combination of two or more thereof:

[Chemical Formula 16]

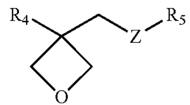

(12)

-continued

[Chemical Formula 17]

(13)

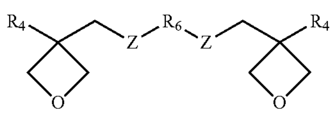

[Chemical Formula 18]

(14)

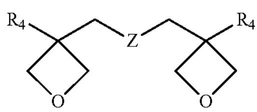

In the above structural formula 12, 13 and 14, $R_4$ represents a hydrogen atom, a linear, branched or cyclic alkyl group having 1 to 6 carbon atom(s), allyl group, aryl group, aralkyl group, furyl group or thienyl, $R_5$ represents a hydrogen atom, a linear, branched or cyclic alkyl group having 1 to 8 carbon atom(s), alkenyl group having 2 to 6 carbon atoms, a group having an aromatic ring, alkylcarbonyl group having 2 to 6 carbon atoms, alkoxycarbonyl group having 2 to 6 carbon atoms, N-alkylcarbamoyl group having 2 to 6 carbon atoms, acryloyl group, or methacryloyl group, $R_6$ represents a divalent organic residual group, and Z represents a oxygen atom or sulfur atom.

The linear, branched or cyclic alkyl group having 1 to 6 carbon atom(s) which is represented by $R_4$ includes, for example, a methyl group, ethyl group, n- or i-propyl group, n-, i- or t-butyl group, pentyl group, hexyl group, cyclohexyl group and the like; the aryl group includes, for example, a phenyl, naphthyl, tolyl, xylyl group and the like; and, the aralkyl group includes, for example, a benzyl, phenethyl group and the like.

The linear, branched or cyclic alkyl group having 1 to 8 carbon atom(s) which is represented by $R_5$ includes, for example, a methyl group, ethyl group, n- or i-propyl group, n-, i- or t-butyl group, pentyl group, hexyl group, cyclohexyl group, 2-ethyl hexyl group and the like; the alkenyl group having 2 to 6 carbon atoms includes, for example, a 1-prophenyl group, 2-prophenyl group, 2-methyl-1-prophenyl group, 2-methyl-2-prophenyl group, 1-butenyl group, 2-butenyl group or 3-butenyl group and the like; the group having an aromatic ring includes, for example, a phenyl group, benzyl group, fluoro benzyl group, methoxybenzyl group, phenoxy ethyl group and the like; the alkylcarbonyl group having 2 to 6 carbon atoms includes, for example, an ethylcarbonyl group, propylcarbonyl group, butylcarbonyl group and the like.

The divalent organic residual group represented by $R_6$ in the above group structural formula 13 includes, for example, a linear, branched or cyclic alkylene group, a polyoxyalkylene group having 4 to 30 carbon atoms, a phenylene group, a xylene group, structures represented by the following structural formula 15 and 16.

As the linear, branched or cyclic alkylene group for $R_6$, an alkylene group having 1 to 15 carbon atom(s) such as a methylene group, ethylene group, 1,2- or 1,3-propylene group, butylene group, cyclohexylene group and the like are preferable. As the polyoxy alkylene group having 4 to 30 carbon atoms, a polyoxyalkylene group having 4 to 8 carbon atoms is preferable, and for example, a polyoxyethylene group and polyoxypropylene group are preferable.

[Chemical Formula 19]

(15)

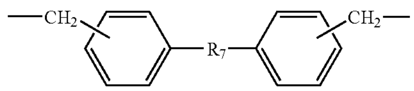

$R_7$ in the structural formula 15 represents an oxygen atom, a sulfur atom, $CH_2$, NH, SO, $SO_2$, $C(CF_3)_2$ or $C(CH_3)_2$.

[Chemical Formula 20]

(16)

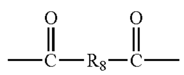

$R_8$ in the structural formula 16 represents an alkylene group having 1 to 6 carbon atom(s), an arylene group and a structure represented by the following structural formula 17:

[Chemical Formula 21]

(17)

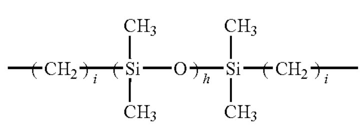

In the above structural formula 17, h represents an integer of 1 to 6, i represents an integer of 1 to 15. The above i is preferably an integer of 1 to 3.

As the above oxetane compound (D), for example, ARONOXETANE OXT-101, ARONOXETANE OXT-121, ARONOXETANE OXT-212, ARONOXETANE OXT-221 (which are manufactured by TOAGOSEI CO., LTD.); ETERNACOLL EHO, ETERNACOLL OXMA, ETERNACOLL OXBP, ETERNACOLL OXTP (which are manufactured by Ube Industries, Ltd.) and the like are commercially available.

In the case where the above oxetane compound (D) is used in combination, the content of the oxetane compound (D) is not particularly limited, but a molar ratio of an oxetanyl group of the oxetane compound (D) to an alicyclic epoxy group of the alicyclic epoxy compound (B), [an oxetanyl group of the oxetane compound (D)/an alicyclic epoxy group of the alicyclic epoxy compound (B)], is preferably 0.01 to 5 and more preferably 0.1 to 2.5.

The cation-polymerizable resin composition according the present invention may optionally comprise various additives in a range wherein an effect of the present invention is not deteriorated.

As the above additives, for example, a silane coupling agent, an organic solvent, a filler, a thixotropy imparting agent, a sensitizer, various polyols mentioned above and other polyols, a leveling agent, an antioxidant, a tackifier, a wax, a thermal stabilizer, a photoresistant stabilizer, a fluorescent whitening agent, a foaming agent, an organic pigment, an inorganic pigment, a dye, a conductivity imparting agent, an antistatic agent, a moisture permeability improver, a water repellent, a hallow foam, a flame retardant, an absorbent, a moisture absorbent, a deodorant, a surfactant, an anti-foaming agent, an antifungal agents, an antiseptic agent, an anti-algae agent, a pigment dispersing agent, an anti-blocking agent, a hydrolysis inhibitor and the like, a water-soluble organic and an inorganic compound, resins such as a thermoplastic resin, a thermosetting resin and the like may be used in combination.

The silane coupling agent, the filler, and the thixotropy imparting agent which are representative as the additives are exemplified herein below.

As the silane coupling agent, for example, 3-glycidoxypropyltrimethoxysilane, 3-glycidoxypropyltriethoxysilane, 3-glycidoxypropylmethyldiethoxysilane, 2-(3,4-epoxy cyclohexyl)ethyltrimethoxysilane, 2-(3,4-epoxycyclohexyl) ethyltriethoxysilane, 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane, 3-mercaptopropyltrimethoxysilane, 3-mercaptopropylmethyldimethoxysilane, vinyltrimethoxysilane, vinyltriethoxysilane, 3-chloropropyltrimethoxysilane or bis(triethoxysilylpropyl)tetrasulfide and the like can be used.

As the filler, for example, calcium carbonate, aluminum hydroxide, barium sulfate, kaolin, talc, carbon black, alumina, magnesium oxide, an inorganic or organic balloon, lithia tourmaline, active carbon and the like can be used.

As the thixotropy imparting agent, for example, a surface-treated calcium carbonate, a fine powder silica, bentonite, zeolite and the like can be used.

Next, a method of preparing the cation-polymerizable resin composition according to the present invention is described.

The cation-polymerizable resin composition according to the present invention can be prepared by mixing and stirring the multi-branched polyether polyol (A), the alicyclic epoxy compound (B), and optionally, the oxetane compound (D) or the above-mentioned additives by using, for example, a closed-type planetary mixer until being homogeneous and then by mixing with the acid generator (C) and stirring. In the preparation, an organic solvent may be optionally used from the viewpoint of easily mixing thereof.

The cation-polymerizable resin composition according to the present invention may be subject to curing by UV irradiation or heating. A curing method may be selected according to an acid generator to be used.

In a case where the photo acid generator is used as the acid generator (C), the polymerization may be initiated by UV irradiation in a range of preferably 50 to 5000 mJ/cm$^2$, more preferably 100 to 3000 mJ/cm$^2$, and even more preferably 100 to 1000 mJ/cm$^2$. By heating the cation-polymerizable resin composition to a temperature of 60 to 80° C. after the UV irradiation, the curing may be further accelerated.

As a generating source of UV rays, for example, a commonly known lamp such as a xenon lamp, a xenon-mercury lamp, a metal halide lamp, a high pressure mercury lamp, a low pressure mercury lamp and the like can be used. The UV irradiation amount was based on a value measured in a wavelength range of 300 to 390 nm using UV Checker UVR-N1 (manufactured by Japan Battery Co., Ltd.).

In a case where the thermal acid generator is used as the acid generator (C), the polymerization may be initiated by heating the coated cation-polymerizable resin composition to a temperature of 60 to 200° C., preferably 80 to 180° C., more preferably 100 to 150° C.

The cation-polymerizable resin composition according to the present invention may be used, for example, for an adhesive agent, a coating agent, a molding agent, an encapsulation agent, and the like, and used preferably, for an adhesive agent among those.

When the cation-polymerizable resin composition is used as an adhesive agent, a laminate wherein at least two substrates are adhered by the above adhesive agent can be manufactured by a method wherein after the composition is coated in a thickness of 10 to 100 μm on one substrate by using, for example, a roll coater, the coated surface is subject to UV irradiation and subsequently, another substrate is adhered to the above coated surface, or by a method wherein after the composition is coated in a thickness of preferably 0.01 to 100 μm and more preferably 0.05 to 50 μm on one substrate by using, for example, a gravure coating method, a rod coating method, a spray coating method, an air knife coating method, a roll coating method and the like, another substrate is adhered to the above coated surface and then subject to heating.

As the above substrates, for example, a plastic substrate comprising a cellulose type resin, a resin having a cycloolefin structure, a norbornene resin and the like, a glass substrate, a metal substrate and the like may be used.

The adhesive agent comprising the cation-polymerizable resin composition according to the present invention may be used particularly for manufacturing optical elements such as a polarizing plate and the like.

A polarizing plate means one in which protective films generally comprising a polyvinyl alcohol are adhered on both sides of a polarizer. Here, the adhesive agent according to the present invention may be suitably used for adhering the polarizer with the protective films.

As the protective films, it is preferable to use a plastic film comprising a cellulose type polymer such as a triacetyl cellulose and the like, a resin having a cycloolefin structure, a norbornene resin and the like which have an optical isotropic property, that is, a property not inhibiting light transmission when it is adhered to the polarizer and are excellent in transparency, smoothness and toughness, and it is preferable to use a plastic film comprising the resin having a cycloolefin structure among those.

As the polarizer, for example, one in which a dichromatic material such as iodine, a dichromatic dye and the like is adsorbed on a plastic substrate comprising a hydrophilic polymer compound such as a polyvinyl alcohol, a partially formulated polyvinyl alcohol, ethylene-vinyl acetate copolymer-type partially saponified material and the like, followed by a uniaxial elongation, a polyene-type oriented film such as a dehydration-treated material of polyvinyl alcohol, or a dihydrochloric acid-treated material of polyvinyl chloride and the like can be used. Among those, it is preferable to use the polyvinyl alcohol film and the iodine or dichromatic dye-adsorbed film.

The thickness of the above substrate obtained in the above-mentioned method, which may be used for manufacturing the laminate and the polarizing plate according to the present invention, is varied according to uses thereof, but it is preferably in a range of from 10 μm to 3 mm.

On a surface of the above substrate, a surface treatment such as a corona discharge treatment, a UV irradiation treatment, an alkaline treatment and the like may be carried out. It is preferable to use the substrate with a surface having a wetting index of preferably at least 45 mN/m, and more preferably at least 50 mN/m. The wetting index means a critical surface tension by Zisman and is a value measured by a standard wetting reagent based on JIS K 8768.

When the cation-polymerizable resin composition according to the present invention is used as a coating agent, a coated film may be formed by a method wherein the composition is coated to a thickness of 2 to 50 μm on various kinds of the substrates by using, for example, a knife coater and the like and then the coated surface is subject to UV irradiation or heating.

EXAMPLES

Hereinafter, the present invention will be described in more detail with reference to examples and comparative examples.

Synthetic Example 1

Synthesis of the Multi-Branched Polyether Polyol (I)

In a 2 L three-necked flask equipped with a reflux condenser, a magnetic stirring rod, and a thermometer, 348 parts by mass (3 moles) of 3-hydroxy methyl-3-ethyloxetane and 348 parts by mass (6 moles) of propylene oxide were mixed, followed by dissolved in 1 L of diethyl ether which does not substantially contain peroxides and cooled in an ice bath of −14° C.

Then, a 60 mass % aqueous solution of 5.5 parts by mass $HPF_6$ as the polymerization initiator was added dropwise into the above flask for 10 minutes. The mixture in the flask became slightly whitened.

Subsequently, the mixture in the above flask was reacted overnight at room temperature, and the next day, the transparent reaction mixture was refluxed for 3 hours, and then the polymerization initiator was deactivated by using a 30 mass % methanol solution of 9 parts by mass of $NaOCH_3$.

After the deactivation of the polymerization initiator, the reaction mixture was filtrated, followed by heating to 75° C. in a bath under a reduced pressure to evaporate off diethyl ether in the reaction mixture. After the diethyl ether was completely evaporated off, 667 parts by mass of the multi-branched polyether polyol (I) was obtained. The yield thereof was 89 mass %.

This multi-branched polyether polyol (I) had a number average molecular weight (Mn)=1,440, a weight average molecular weight (Mw)=3,350 and a hydroxylic value (OHV)=265, and a molar ratio of 3-hydroxy methyl-3-ethyloxetane to propylene oxide from a proton-NMR was 1:1.9.

Figure 2:
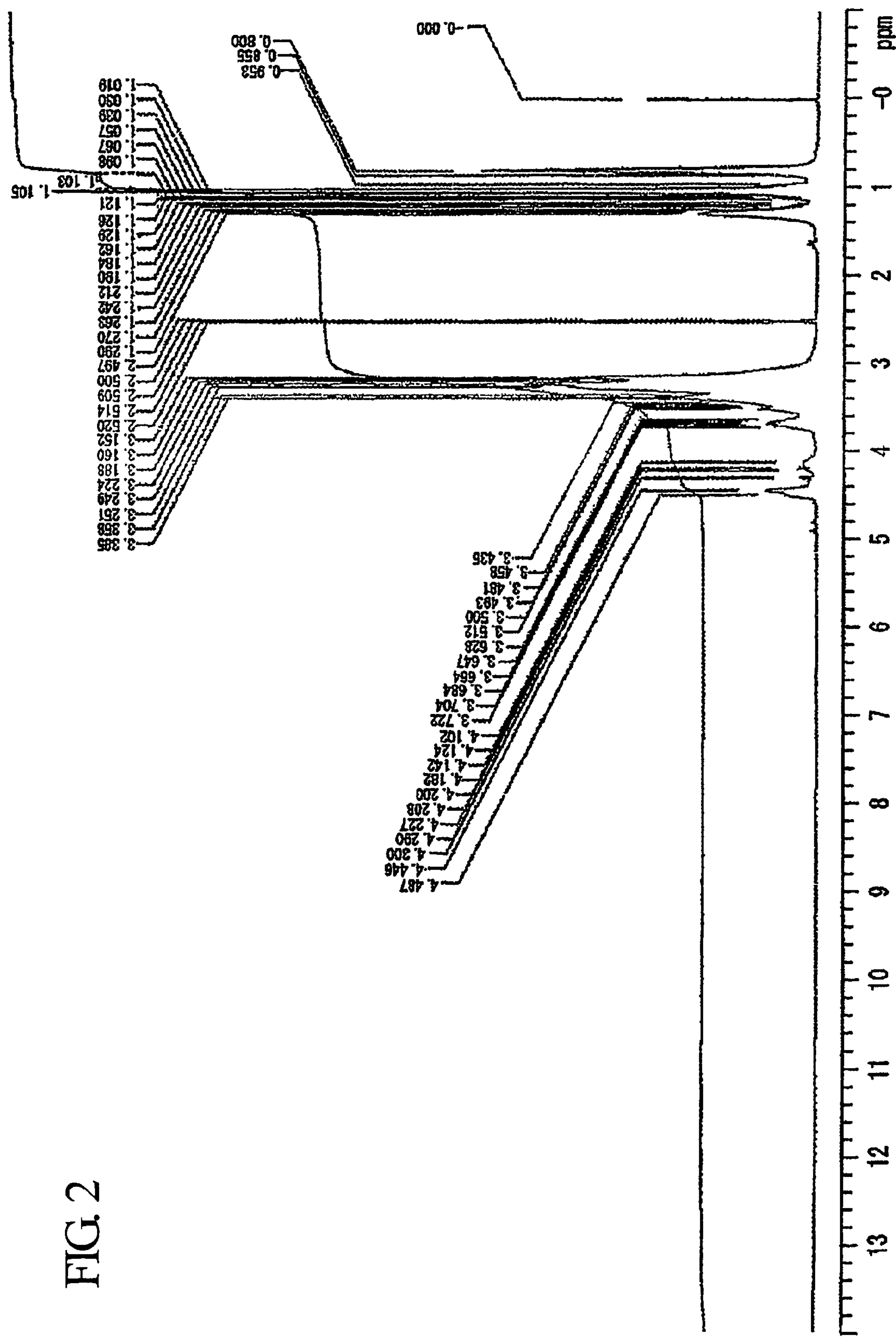
FIG. 2 is a chart graph of proton-NMR of a multi-branched polyether polyol (I) obtained from Synthetic Example 1.
Figure 3:
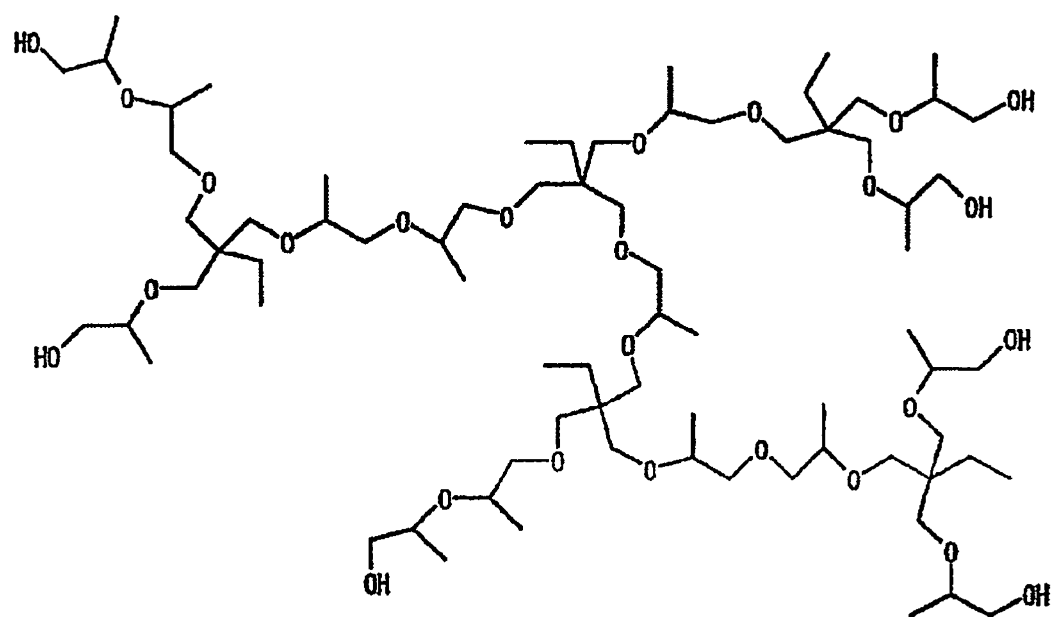
FIG. 3 is a chemical formula showing an example of a multi-branched polyether polyol used in the present invention.
Figure 4:
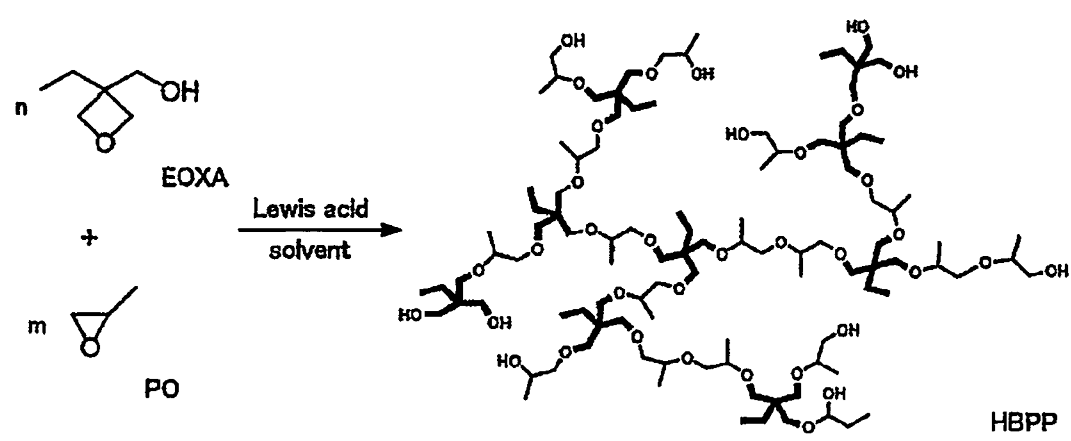
FIG. 4 is a chemical reaction scheme showing an example of formation of a multi-branched polyether polyol used in the present invention.

A ratio of the number of secondary hydroxyl groups to the total number of hydroxyl groups was 39.0%. A $^{13}C$-NMR chart graph of this multi-branched polyether polyol is shown in FIG. 1 and a proton-MNR chart graph is shown in FIG. 2. It was confirmed that primary hydroxyl groups and secondary hydroxyl groups are present in the molecular structure.

Example 1

In a closed-type planetary mixer, 62.7 parts by mass of the above multi-branched polyether polyol (I) and 37.3 parts by mass of CYRACURE UVR-6110 were placed and mixed with stirring to be homogeneous. Then, 5 parts by mass of CPI-100 P was added and mixed with stirring to prepare the cation-polymerizable resin composition.

Example 2

In a closed-type planetary mixer, 50.0 parts by mass of the above multi-branched polyether polyol (I) and 50.0 parts by mass of CYRACURE UVR-6110 were placed and mixed with stirring to be homogeneous. Then, 5 parts by mass of CPI-100 P was added and mixed with stirring to prepare the cation-polymerizable resin composition.

Example 3

In a closed-type planetary mixer, 25.0 parts by mass of the above multi-branched polyether polyol (I) and 75.0 parts by mass of CYRACURE UVR-6110 were placed and mixed with stirring to be homogeneous. Then, 5 parts by mass of CPI-100 P was added and mixed with stirring to prepare the cation-polymerizable resin composition.

Example 4

In a closed-type planetary mixer, 10.0 parts by mass of the above multi-branched polyether polyol (I) and 90.0 parts by mass of CYRACURE UVR-6110 were placed and mixed with stirring to be homogeneous. Then, 5 parts by mass of CPI-100 P was added and mixed with stirring to prepare the cation-polymerizable resin composition.

Example 5

In a closed-type planetary mixer, 65.1 parts by mass of the above multi-branched polyether polyol (I) and 34.9 parts by mass of CYRACURE UVR-6110 (3,4-epoxycyclo hexylmethyl-3,4-epoxycyclohexylcarboxylate, manufactured by Dow Chemical Japan Limited) were placed and mixed with stirring to be homogeneous.

Then, 5 parts by mass of CPI-100 P (a propylene carbonate 50 mass % solution of diphenyl-4-(phenylthio)phenylsulfonium hexafluorophosphate, manufactured by Sanapro Limited) was added and mixed with stirring to prepare the cation-polymerizable resin composition.

Example 6

In a closed-type planetary mixer, 49.0 parts by mass of the above multi-branched polyether polyol (I), 49.0 parts by mass of CYRACURE UVR-6110, and 2.0 parts by mass of ARONOXETANE OXT-221 (bis[1-ethyl(3-oxetanyl)]methyl ether, manufactured by TOAGOSEI CO., LTD.) were placed and mixed with stirring to be homogeneous.

Then, 5 parts by mass of CPI-100 P was added and mixed with stirring to prepare the cation-polymerizable resin composition.

Example 7

In a closed-type planetary mixer, 41.2 parts by mass of the above multi-branched polyether polyol (I), 41.2 parts by mass of CYRACURE UVR-6110, and 17.6 parts by mass of ARONOXETANE OXT-221 were placed and mixed with stirring to be homogeneous.

Then, 5 parts by mass of CPI-100 P was added and mixed with stirring to prepare the cation-polymerizable resin composition.

Example 8

In a closed-type planetary mixer, 35.1 parts by mass of the above multi-branched polyether polyol (I), 35.1 parts by mass of CYRACURE UVR-6110, and 29.8 parts by mass of ARONOXETANE OXT-221 were placed and mixed with stirring to be homogeneous.

Then, 5 parts by mass of CPI-100 P was added and mixed with stirring to prepare the cation-polymerizable resin composition.

Example 9

In a closed-type planetary mixer, 22.0 parts by mass of the above multi-branched polyether polyol (I), 22.0 parts by mass of CYRACURE UVR-6110, and 56.0 parts by mass of ARONOXETANE OXT-221 were placed and mixed with stirring to be homogeneous.

Then, 5 parts by mass of CPI-100 P was added and mixed with stirring to prepare the cation-polymerizable resin composition.

Comparative Example 1

50.0 Parts by mass of PTMG-1000 [polytetramethyleneglycol, a hydroxylic value (OHV)=112.5, manufactured by Mitsubishi Chemical Co., Limited] and 50.0 parts by mass of CYRACURE UVR-6110 and mixed with stirring to be homogeneous.

Then, 5 parts by mass of CPI-100 P was added and mixed with stirring to prepare the cation-polymerizable resin composition.

Comparative Example 2

50.0 Parts by mass of Boltom H2004 (a multi-branched polyester polyol, and a hydroxylic value (OHV)=120, manufactured by Perstorp Co., Limited] and 50.0 parts by mass of CYRACURE UVR-6110 were mixed with stirring to be homogeneous.

Then, 5 parts by mass of CPI-100 P was added and mixed with stirring to prepare the cation-polymerizable resin composition.

Comparative Example 3

41.2 Parts by mass of Boltom H2004, 41.2 parts by mass of CYRACURE UVR-6110 and 17.6 parts by mass of ARONOXETANE OXT-221 were mixed with stirring to be homogeneous.

Then, 5 parts by mass of CPI-100 P was added and mixed with stirring to prepare the cation-polymerizable resin composition.

Comparative Example 4

50.0 Parts by mass of the multi-branched polyetherpolyol (I) and 50.0 parts by mass of ARONOXETANE OXT-221 were mixed with stirring to be homogeneous.

Then, 5 parts by mass of CPI-100 P was added and mixed with stirring to prepare the cation-polymerizable resin composition.

Comparative Example 5

50.0 Parts by mass of the multi-branched polyetherpolyol (I) and 50.0 parts by mass of EX-214 L (1,4-butanediol diglycidylether, manufactured by Nagase Chemtex Co., Limited) were mixed with stirring to be homogeneous.

Then, 5 parts by mass of CPI-100 P was added and mixed with stirring to prepare the cation-polymerizable resin composition.

Comparative Example 6

50.0 Parts by mass of the multi-branched polyetherpolyol (I) and 50.0 parts by mass of jER828 (bisphenol A-type epoxy resin, manufactured by Japan Eepoxy Resin Co., Limited) were mixed with stirring to be homogeneous.

Then, 5 parts by mass of CPI-100 P was added and mixed with stirring to prepare the cation-polymerizable resin composition.

Comparative Example 7

100.0 Parts by mass of CYRACURE UVR-6110 and 5 parts by mass of CPI-100 P were mixed with stirring until being homogeneous to prepare the cation-polymerizable resin composition.

Comparative Example 8

50.0 Parts by mass of CYRACURE UVR-6110 and 50.0 parts by mass of ARONOXETANE OXT-221 were mixed with stirring to be homogeneous.

Then, 5 parts by mass of CPI-100 P was added and mixed with stirring to prepare the cation-polymerizable resin composition.

Comparative Example 9

100.0 Parts by mass of ARONOXETANE OXT-221 and 5 parts by mass of CPI-100 P were mixed with stirring until being homogeneous to prepare the cation-polymerizable resin composition.

Storage stability, curability, and adhesive strength of each of the cation-polymerizable resin compositions of Examples 1 to 9 and Comparative Examples 1 to 9 were evaluated by the following methods.

[Evaluation Method of Storage Stability]

Each of the cation-polymerizable resin compositions described in Examples 1 to 9 and Comparative Examples 1 to 9 was placed in a light-resistant, polyethylene bottle and the viscosity at 25° C. was measured by using a BM-type rotating viscometer, wherein the measured value was taken as the initial viscosity.

Next, after the light-resistant, polyethylene bottle containing the cation-polymerizable resin composition was sealed and left to stand for 7 days at 50° C., the viscosity at 25° C. was measured, wherein the measured value was taken as the viscosity after a storage stability test.

The BM-type rotating viscometer used was a TV-10 type viscometer, manufactured by TOKISANGYO CO., LTD.

The viscosity increase rate (%) was calculated based on the above initial viscosity value, the viscosity value after the storage stability test and the following formula:

$$\text{viscosity increase rate}(\%)=(\text{the viscosity after the storage stability test}/\text{the initial viscosity})\times 100-100.$$

The storage stability was evaluated based on the following reference. It may be mentioned that the storage stability is excellent when the above viscosity increase rate is lower than 10%, which is preferable in practical uses:

Good: the viscosity increase rate was lower than 10%;

Poor: the viscosity increase rate was 10% or higher.

[Evaluation Method of Curability]

After each of the cation-polymerizable resin compositions described in Examples 1 to 9 and Comparative Examples 1 to 9 was coated to a thickness of 100 μm on a polypropylene plate with an applicator, the coated surface comprising the cation-polymerizable resin composition was subject to 450 to 550 mJ/cm$^2$ of UV irradiation using a conveyor type UV irradiation instrument CSOT-40 (manufactured by Japan Battery Co., Ltd., a high pressure mercury lamp with an intensity of 120 W/cm). After the UV irradiation, the coated polypropylene plate was heated in a hot-air dryer adjusted to 85° C. for 3 min, followed by curing under an environment of 23° C. and humidity 50% RH for 3 days.

The amount of the UV irradiation is based on a value measured in a wavelength range of 300 to 390 nm by using a UV checker UVR-N1 (manufactured by Japan Battery Co., Ltd.).

The cured product comprising the cation-polymerizable resin composition after curing was removed from the propylene plate, and a sample of about 1 g thereof was taken to measure the mass using a precision electronic balance, in which the measured value was taken as the initial mass (g).

The cured product comprising the cation-polymerizable resin composition after curing, the mass of which was measured, was immersed into 100 g of ethyl acetate at 50° C. for 24 hours, and then the cured product which was not eluted was dried at 107° C. for 1 hour to measure the mass using a precision electronic balance. The measured value was taken as the mass (g) after the immersion.

Curability was evaluated based on the above initial mass, the mass after the immersion and the following formula:

portion of gel(mass%)=[the mass after the immersion (g)/the initial mass(g)]×100

The curability was evaluated based on the following reference. It may be mentioned that the curability is excellent when the above portion of gel is 90 mass % or higher, which is preferable in practical use:

Good: the portion of gel was 90 mass % or higher;

Poor: the portion of gel was lower than 90 mass %.

[Evaluation Method of Adhesive Strength]

(Method of Preparing a Test Plate)

An amount of 0.01 g of each of the cation-polymerizable resin compositions described in Examples 1 to 9 and Comparative Examples 1 to 9 was added dropwise on a glass plate (JIS R 3202 Standard, 25 mm×100 mm, a thickness of 3 mm), and another glass plate (JIS R 3202 Standard, 25 mm×100 mm, a thickness of 3 mm) was located on the surface on which the composition was added dropwise, in a twisted angle of 90.

Next, a weight of 0.5 kg/(25 mm×25 mm) was applied to an overlapped part of the above two glass plates for 5 seconds, and then that part was irradiated with UV rays of 450 to 550 mJ/cm$^2$ through a glass plate. After the UV irradiation, the laminated glass plates were heated in a hot-air dryer adjusted to 85° C. for 3 min, and then cured under an environment of 23° C. and humidity 50% RH for 3 days, wherein the cured product was taken as a test plate. The amount of the UV irradiation was based on a value measured in a wavelength range of 300 to 390 nm using a UV checker UVR-N1 40 (manufactured by Japan Battery Co., Ltd.).

One glass plate comprising each of the test plates prepared by the above method was fixed horizontally, and an upward force was applied to both ends of another glass plate (a tensile velocity, 5 mm/min) to measure the plane tensile adhesive strength of each of the test plates.

The adhesive strength was evaluated based on the following reference. It may be mentioned that the adhesive strength is excellent when the above plane tensile adhesive strength is 0.8N/mm$^2$ or higher or when a material of the substrate is broken, which is preferable in practical use:

Good: 0.8N/mm$^2$ or higher, or a material of the substrate was broken (cracking of the glass. Referred to as MB);

Poor: lower than 0.8N/mm$^2$.

TABLE 1

| | | | Exam. 1 | Exam. 2 | Exam. 3 | Exam. 4 | Exam. 5 |
|---|---|---|---|---|---|---|---|
| (A) Multi-branched polyether polyol | (I) | parts by mass | 62.7 | 50.0 | 25.0 | 10.0 | 65.1 |
| (B) Alicyclic epoxy compound | UVR-6110 | | 37.3 | 50.0 | 75.0 | 90.0 | 34.9 |
| (C) Acid generator | CPI-100P | | 5.0 | 5.0 | 5.0 | 5.0 | 5.0 |
| (D) Oxetane compound | OXT-221 | | — | — | — | — | — |
| [Epoxy group of (B)]/[Hydroxyl group of (A)], based on moles | | | 1/1 | 1.7/1 | 5.0/1 | 15.1/1 | 0.9/1 |
| [Oxetanyl group of (D)]/[Epoxy group of (B)], based on moles | | | — | — | — | — | — |
| Storage stability: Viscosity increase rate (%) | Measured value | | 0 | 0 | 0 | 0 | 0 |
| | Evaluation | | good | good | good | good | good |
| Curability: Portion of gel (mass %) | Measured value | | 93 | 95 | 92 | 91 | 91 |
| | Evaluation | | good | good | good | good | good |
| Adhesive strength (N/mm$^2$) | Measured value | | MB | MB | 1.6 | 2.1 | 0.9 |
| | Evaluation | | good | good | good | good | good |

TABLE 2

| | | | Exam. 6 | Exam. 7 | Exam. 8 | Exam. 9 |
|---|---|---|---|---|---|---|
| (A) Multi-branched polyether polyol | (I) | parts by mass | 49.0 | 41.2 | 35.1 | 22.0 |
| (B) Alicyclic epoxy compound | UVR-6110 | | 49.0 | 41.2 | 35.1 | 22.0 |
| (C) Acid generator | CPI-100P | | 5.0 | 5.0 | 5.0 | 5.0 |
| (D) Oxetane compound | OXT-221 | | 2.0 | 17.6 | 29.8 | 56.0 |
| [Epoxy group of (B)]/[Hydroxyl group of (A)], based on moles | | | 1.7/1 | 1.7/1 | 1.7/1 | 1.7/1 |

TABLE 2-continued

| | | Exam. 6 | Exam. 7 | Exam. 8 | Exam. 9 |
|---|---|---|---|---|---|
| [Oxetanyl group of (D)]/[Epoxy group of (B)], based on moles | | 0.05/1 | 0.5/1 | 1/1 | 3/1 |
| Storage stability: | Measured value | 0 | 0 | 0 | 0 |
| Viscosity increase rate (%) | Evaluation | good | good | good | good |
| Curability: Portion | Measured value | 95 | 96 | 96 | 96 |
| of gel (mass %) | Evaluation | good | good | good | good |
| Adhesive strength | Measured value | MB | 1.3 | 1.1 | 1.0 |
| ($N/mm^2$) | Evaluation | good | good | good | good |

TABLE 3

| | | | Com. Exam. 1 | Com. Exam. 2 | Com. Exam. 3 | Com. Exam. 4 |
|---|---|---|---|---|---|---|
| (A) Multi-branched polyether polyol | (I) | parts by mass | — | — | — | 50.0 |
| (B) Alicyclic epoxy compound | UVR-6110 | | 50.0 | 50.0 | 41.2 | — |
| (C) Acid generator | CPI-100P | | 5.0 | 5.0 | 5.0 | 5.0 |
| (D) Oxetane compound | OXT-221 | | — | — | 17.6 | 50.0 |
| Glycidyl | EX-214L | | — | — | — | — |
| compound | jER828 | | — | — | — | — |
| Polyether polyol | PTMG-1000 | | 50.0 | — | — | — |
| Multi-branched polyester polyol | H2004 | | — | 50.0 | 41.2 | — |
| Storage stability: | Measured value | | 0 | 22 | 19 | 0 |
| viscosity increase rate (%) | Evaluation | | good | bad | bad | good |
| Curability: portion | Measured value | | 93 | 83 | 90 | 54 |
| of gel (mass %) | Evaluation | | good | bad | good | bad |
| Adhesive strength | Measured value | | 0 | 1.3 | 1.2 | 0.2 |
| ($N/mm^2$) | Evaluation | | bad | good | good | bad |

TABLE 4

| | | | Com. Exam. 5 | Com. Exam. 6 | Com. Exam. 7 | Com. Exam. 8 |
|---|---|---|---|---|---|---|
| (A) Multi-branched polyether polyol | (I) | parts by mass | 50.0 | 50.0 | — | — |
| (B) Alicyclic epoxy compound | UVR-6110 | | — | — | 100.0 | 50.0 |
| (C) Acid generator | CPI-100P | | 5.0 | 5.0 | 5.0 | 5.0 |
| (D) Oxetane compound | OXT-221 | | — | — | — | 50.0 |
| Glycidyl | EX-214L | | 50.0 | — | — | — |
| compound | jER828 | | — | 50.0 | — | — |
| polyether polyol | PTMG-1000 | | — | — | — | — |
| Multi-branched polyester polyol | H2004 | | — | — | — | — |
| Storage stability: | Measured value | | 2 | 3 | 0 | 0 |
| viscosity increase rate (%) | Evaluation | | good | good | good | good |
| Curability: portion | Measured value | | 29 | 36 | 81 | 96 |
| of gel (mass %) | Evaluation | | bad | bad | bad | good |
| Adhesive strength | Measured value | | 0.4 | 0.4 | MB | 0 |
| ($N/mm^2$) | Evaluation | | bad | bad | good | bad |

TABLE 5

| | | | Com. Exam. 9 |
|---|---|---|---|
| (A) Multi-branched polyether polyol | (I) | parts by mass | — |
| (B) Alicyclic epoxy compound | UVR-6110 | | — |
| (C) Acid generator | CPI-100P | | 5.0 |
| (D) Oxetane compound | OXT-221 | | 100.0 |
| Glycidyl compound | EX-214L | | — |
| | jER828 | | — |
| Polyether polyol | PTMG-1000 | | — |
| Multi-branched polyester polyol | H2004 | | — |
| Storage stability: | Measured value | | 0 |
| viscosity increase rate (%) | Evaluation | | good |
| Curability: | Measured value | | 95 |
| portion of gel (mass %) | Evaluation | | good |
| Adhesive strength (N/mm$^2$) | Measured value | | 0 |
| | Evaluation | | bad |

Description of the compounds in TABLE 1 to 5:

⌈UVR-6110⌋ 3,4-epoxycyclohexylmethyl-3,4-epoxycyclohexylcarboxylate (manufactured by Dow Chemical Japan Limited, Trademark: CYRACURE, epoxy group equivalent weight=137 g).

⌈CPI-100 P⌋ 150 mass % propylene carbonate solution of diphenyl-4-(phenylthio)phenylsulfonium hexafluorophosphate (manufactured by Sanapro Limited).

⌈OXT-221⌋ bis[1-ethyl(3-oxetanyl)]methylether (manufactured by TOAGOSEI CO., LTD., Trademark: ARONOXETANE, oxetanyl group equivalent weight=107.2 g).

⌈EX-214⌋ 1,4-butanedioldiglycidylether (manufactured by Nagase Chemtex Co., Limited, Trademark: Denacol, epoxy group equivalent weight=120 g)

⌈jER828⌋ bisphenol A type epoxy resin (manufactured by Japan Epoxy Resin Co., Limited, epoxy group equivalent weight=189 g)

⌈PTMG-1000⌋ polytetramethyleneglycol (manufactured by Mitsubishi Chemical Co., Limited)

⌈H2004⌋ multi-branched polyester polyol (manufactured by Perstorp Co., Limited, Trademark: Bortorn).

In the above, the preferable examples according to the present invention are described, but the present invention is not limited thereto. It is possible that various additions, omissions, changes and modifications in the constitution can be made without departing from the spirit of the present invention. The present invention is not limited to the above-mentioned description and only limited by the claims attached herewith.

INDUSTRIAL APPLICABILITY

The cation-polymerizable resin composition according to the present invention has excellent storage stability, adhesive strength and curability, and thus can be used in a wide range of fields including, for example, various kinds of adhesive agents and tackiness agents such as an adhesive for optical elements and the like, various kinds of sealing agents such as a seal agent for liquid crystals and the like, various kinds of resists such as a resist for liquid phase printed circuit board, a dry film resist and the like, various kinds of coating agents such as a coating agent for a releasing paper, a coat agent for a photodisc, a can coating agent, a surface coat agent for an artificial leather/a synthetic leather and the like, vehicles for various kinds of inks such as an ink for a flat panel, a screen ink, a flexo ink, a gravure ink, a jet ink and the like, and has a great value of practical use.

The invention claimed is:

1. A cation-polymerizable resin composition comprising:

(A) a multi-branched polyether polyol obtained from a ring-opening reaction consisting of (a1) a hydroxyalkyloxetane, (a2) an epoxy compound having one epoxy group, a polymerization initiator and an organic solvent, wherein (a1) and (a2) are mixed at the same time, and the epoxy compound (a2) is at least one selected from the group consisting of propylene oxide, 1-butene oxide, 1-pentene oxide and 1-hexene oxide;

(B) an alicyclic epoxy compound having at least two alicyclic epoxy groups; and (C) an acid generator.

2. The cation-polymerizable resin composition according to claim 1, wherein the multi-branched polyether polyol (A) has a number average molecular weight of 1,000 to 4,000 and a hydroxylic value of 150 to 350 mg KOH/g.

3. An adhesive agent comprising the cation-polymerizable resin composition according to claim 2.

4. A laminate comprising at least two substrates that are adhered by the adhesive agent according to claim 3.

5. A polarizing plate, wherein a film comprising a resin having a cycloolefin structure is adhered to a surface of a polarizer by the adhesive agent according to claim 3.

6. The cation-polymerizable resin composition according to claim 1, wherein the multi-branched polyether polyol (A) has primary hydroxyl groups and secondary hydroxyl groups in a molecular structure thereof, the number of the secondary hydroxyl groups being 20 to 70% with respect to the number of the total hydroxyl groups present in one molecule.

7. An adhesive agent comprising the cation-polymerizable resin composition according to claim 6.

8. A laminate comprising at least two substrates that are adhered by the adhesive agent according to claim 7.

9. A polarizing plate, wherein a film comprising a resin having a cycloolefin structure is adhered to a surface of a polarizer by the adhesive agent according to claim 7.

10. The cation-polymerizable resin composition according to claim 1, wherein the hydroxyalkyloxetane (a1) is 3-hydroxymethyl-3-ethyloxetane or 3-hydroxymethyl-3-methyloxetane.

11. An adhesive agent comprising the cation-polymerizable resin composition according to claim 10.

12. The cation-polymerizable resin composition according to claim 1, wherein a molar ratio of [the hydroxyalkyloxetane (a1)]/[the epoxy compound (a2)] is 1/1 to 1/3.

13. An adhesive agent comprising the cation-polymerizable resin composition according to claim 12.

14. The cation-polymerizable resin composition according to claim 1, wherein a molar ratio of the alicyclic epoxy group of the alicyclic epoxy compound (B) to the hydroxyl group of the multi-branched polyether polyol (A), [the alicyclic epoxy group of the alicyclic epoxy compound (B)]/[the hydroxyl group of the multi-branched polyether polyol (A)], is 1 or more.

15. The cation-polymerizable resin composition according to claim 1, further comprising (D) an oxetane compound having an oxetane ring structure.

16. An adhesive agent comprising the cation-polymerizable resin composition according to claim 1.

17. A laminate comprising at least two substrates that are adhered by the adhesive agent according to claim 16.

18. A polarizing plate, wherein a film comprising a resin having a cycloolefin structure is adhered to a surface of a polarizer by the adhesive agent according to claim 16.

19. The cation-polymerizable resin composition according to claim 1, wherein a molar ratio of [the hydroxyalkyloxetane (a1)]/[the epoxy compound (a2)] is 1/1 to 1/6.

20. The cation-polymerizable resin composition according to claim 1, wherein a molar ratio of [the hydroxyalkyloxetane (a1)]/[the epoxy compound (a2)] is 1/1 to 1/10.

21. The cation-polymerizable resin composition according to claim 1, wherein the multi-branched polyether polyol (A) is a random copolymerized polymer.

* * * * *